United States Patent [19]

Ueda

[11] 4,286,567
[45] Sep. 1, 1981

[54] EXHAUST GAS RECIRCULATION CONTROL SYSTEM FOR AN INTERNAL COMBUSTION ENGINE

[75] Inventor: Tatehito Ueda, Susono, Japan

[73] Assignee: Toyota Jidosha Kogyo Kabushiki Kaisha, Aichi, Japan

[21] Appl. No.: 107,519

[22] Filed: Dec. 27, 1979

[51] Int. Cl.³ .......................................... F02M 25/06
[52] U.S. Cl. ................................................. 123/569
[58] Field of Search ........................ 123/569, 568, 571

[56] References Cited

FOREIGN PATENT DOCUMENTS 2658052 7/1978 Fed. Rep. of Germany ........... 123/569

Primary Examiner—Wendell E. Burns
Attorney, Agent, or Firm—Birch, Stewart, Kolasch & Birch

[57] ABSTRACT

An exhaust gas recirculation control system for particular application to a diesel engine, which includes a combination of a fuel injection pump having a movable fuel amount determining element whose position regulates the amount of fuel injected, a conversion device having a fixed orifice and a variable orifice provided downstream of the fixed orifice and whose effective opening area is varied according to the movement of the fuel amount determining element, whereby, when a constant fluid pressure is supplied to the fixed orifice, a fluid pressure which changes according to the amount of fuel injected is taken off at a middle portion between the fixed and variable orifices, and a fluid pressure actuator which operates an exhaust gas recirculation control valve by being energized by the fluid pressure taken off from the abovementioned middle portion.

6 Claims, 5 Drawing Figures

EXHAUST GAS RECIRCULATION CONTROL SYSTEM FOR AN INTERNAL COMBUSTION ENGINE

BACKGROUND OF THE INVENTION

The present invention relates to an exhaust gas recirculation control system, and, more particularly, relates to an exhaust gas recirculation control system which is particularly suited for application to a diesel engine.

The exhaust gas recirculation in diesel engines is to replace a part of the air inhaled into the cylinders of the engine that is generally in excess of that which is required for combustion of the fuel injected into the cylinders of the engine, by recirculated exhaust gas, in order to suppress emission of harmful NOx pollutants. In this diesel engine exhaust gas recirculation, it is desirable that the amount of air which is replaced by exhaust gas should be proportional to the amount of air which is in excess of the actual air requirement for combustion of the actual amount of fuel injected, so that maximum possible amount of excess air is reduced from the air/gas flow supplied to the cylinders of the engine, without causing unstable combustion of fuel in the cylinders, while accomplishing maximum effect of suppressing NOx emission, over the entire operational region of the engine. Since the excess air ratio in the diesel engine decreases as the load on the engine increases, it is necessary to control the exhaust gas recirculation quantity so that the exhaust gas recirculation ratio decreases, as the load on the engine increases. The exhaust gas recirculation ratio is defined as the ratio of the quantity of exhaust gas recirculated and introduced into the inlet system of the engine to the total quantity of inlet gases inhaled by the engine, which is the sum of the quantity of the recirculated exhaust gases and the amount of fresh air inhaled by the engine.

Therefore, in order to control exhaust gas recirculation in a diesel engine, it is necessary to obtain a control signal which represents engine power output or load, and is effective for operating a means for controlling exhaust gas recirculation. In the case of a gasoline engine, wherein the speed regulator is the inlet throttle valve which controls the amount of intake mixture, the inlet manifold vacuum can be effectively used as such a control signal. However, in the case of a diesel engine, the power output of or the load on the engine is controlled by the amount of fuel injected per unit time, and, therefore, it is not generally possible, with a diesel engine, to perform control of exhaust gas recirculation, according to the load on the engine, by using a diaphragm operated type exhaust gas recirculation control valve which responds to inlet manifold vacuum, as is done commonly with gasoline engines. Accordingly, therefore, in the prior art, in a diesel engine the conventional exhaust gas recirculation control valve has been directly connected to and operated by either the accelerator pedal linkage of the vehicle, or the control lever of the fuel injection pump, so that the exhaust gas recirculation control valve has been operated according to the operation of the accelerator lever, or the control lever.

This form of control means for exhaust gas recirculation is fairly easy and simple to manufacture, but there is a problem that it tends to increase the amount of force required for manipulation of the accelerator pedal, and thereby may deteriorate the operational feeling of the accelerator pedal and therefore the drivability of the vehicle.

As an alternative system for controlling diesel exhaust gas recirculation, there has been proposed a system which comprises a diaphragm type exhaust gas recirculation control valve, the diaphragm device being actuated by vacuum provided by a pneumatic governor diaphragm chamber installed in the fuel injection pump. However, with this system of exhaust gas recirculation control, the problem arises that it is not really possible to obtain enough power for operating the exhaust gas recirculation control valve from the vacuum supplied by the pneumatic governor diaphragm chamber, because the vacuum present in this pneumatic governor diaphragm chamber is basically relatively small. Further, because of this, there arises the problem that the position of the exhaust gas recirculation control valve may be directly displaced by the dynamic pressure of the inlet air flow and/or the recirculating exhaust gas flow.

As another possible solution to the problem of diesel exhaust gas recirculation control, the possibility has been explored of controlling exhaust gas recirculation quantity continuously to the appropriate and correct value by measuring the amount of fuel injected to the combustion chambers of the engine per one cycle, and by opening and closing an exhaust gas recirculation control valve by a pressure type and/or electric type actuator, based upon these measurements. However, in this case, the control system as a whole becomes very complicated, and various problems occur when it is in practice mounted to an operating automobile.

SUMMARY OF THE INVENTION

Therefore, it is the object of the present invention to provide an exhaust gas recirculation control system, for a diesel engine, which is simple in structure, and yet provides a definite control operation of exhaust gas recirculation ratio in accordance with the power output of or the load on the engine.

This, and other objects, are achieved, according to the present invention, in a diesel engine, comprising an exhaust system, an inlet system, and an exhaust gas recirculation system, by a device which is the combination of: a fuel injection pump which comprises a movable fuel amount determining element, the position of which regulates the amount of fuel provided for injection by the fuel injection pump; a conversion device, comprising: a fixed orifice, to the upstream side of which is supplied a substantially constant fluid pressure; a fluid passage downstream of the fixed orifice; a pressure take-off passage branching from the fluid passage; and a variable orifice downstream of the fluid passage whose effective opening area is varied according to the movement of the fuel amount determining element; fluid flowing from the upstream side of the fixed orifice through it, through the fluid passage, and through the variable orifice, in that order, the pressure of fluid at the point where the pressure take-off passage branches from the fluid passage varying according to the position of the fuel amount determining element; an exhaust gas recirculation control valve which controls the amount of exhaust gas recirculated from the exhaust system to the inlet system through the exhaust gas recirculation system; and an actuator, which is energized by the fluid pressure supplied through the pressure take-off passage, and operates the exhaust gas recircuation control valve.

According to a particular feature of the present invention, a part of the fuel supplied by the fuel supply pump and regulated of its pressure by the pressure regulator, incorporated in the fuel supply system attached to the engine, will be used as the fluid which supplies the abovementioned substantially constant fluid pressure to the upstream side of the fixed orifice. By this arrangement, it is omitted to provide a particular device for supplying pressure-controlled fluid for the purpose of operation of the exhaust gas recirculation control system.

BRIEF DESCRIPTION OF THE DRAWINGS

The present invention will become more fully understood from the following description of a preferred embodiment thereof, which is to be taken in conjunction with the accompanying drawings. It should be clearly understood, however, that the description of the embodiment, and the drawings, are all of them provided purely for the purposes of illustration and explanation only, and are in no way to be taken as limitative of the scope of the present invention. In the drawings.

DESCRIPTION OF THE PREFERRED EMBODIMENT

Figure 1:
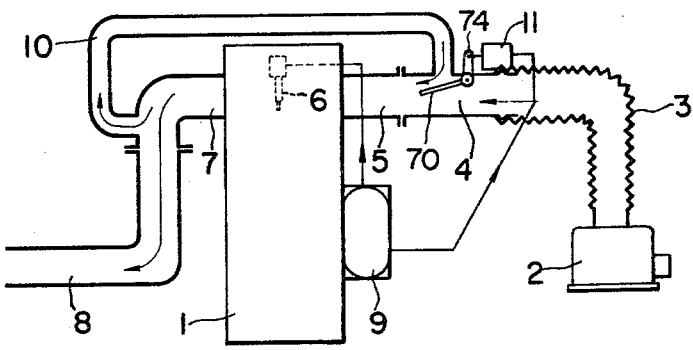
FIG. 1 is a diagrammatical view showing a diesel engine having an exhaust gas recirculation system, in which the present invention is incorporated.

Referring now to FIG. 1, the reference numeral 1 designates a diesel engine which inhales air through an air cleaner 2, an inlet duct 3, in which an exhaust gas recirculation control valve 4 is incorporated, and an inlet manifold 5, mixes with this air the fuel injected by a fuel injection nozzle 6 in the combustion chamber not definitely shown in the figure, and exhausts exhaust gases through an exhaust manifold 7 and an exhaust pipe 8. The fuel injection nozzle 6 is supplied with a predetermined amount of liquid fuel at each intake stroke from a fuel injection pump 9.

An exhaust gas recirculation passage 10 is provided so as to take out a part of the exhaust gas from a middle portion of the exhaust manifold 7 and to recirculate it to a middle portion of the inlet duct 3 where the exhaust gas recirculation control valve 4 is provided so as to control the amount of gas recirculated.

The exhaust gas recirculation valve 4 is operated by an actuator 11 which is energized, as mentioned hereinunder, by the fluid pressure supplied from a pressure controller 50, and controls exhaust gas recirculation in relation to the operation of the fuel injection pump 9.

The fuel injection pump 9, which is of a distributing type fuel injection pump, as explained hereinunder, is supplied with liquid fuel contained in the fuel tank 12 through a passage 13, a fuel pump 14, and a passage 15. A part of the passage 16, a pressure regulator 17, and a passage 18 so as to be returned to the fuel tank 12, whereby the pressure of the liquid fuel conducted through the passage 15 is maintained substantially at a constant level. Further, a part of the fuel supplied to the fuel injection pump 9, which is actually required by the operating engine, is supplied through a passage 19 to the fuel injection nozzle 6, so as to be injected into the combustion chamber of the engine, while the remaining fuel is returned to the fuel tank 12 through a passage 18'.

Figure 3:
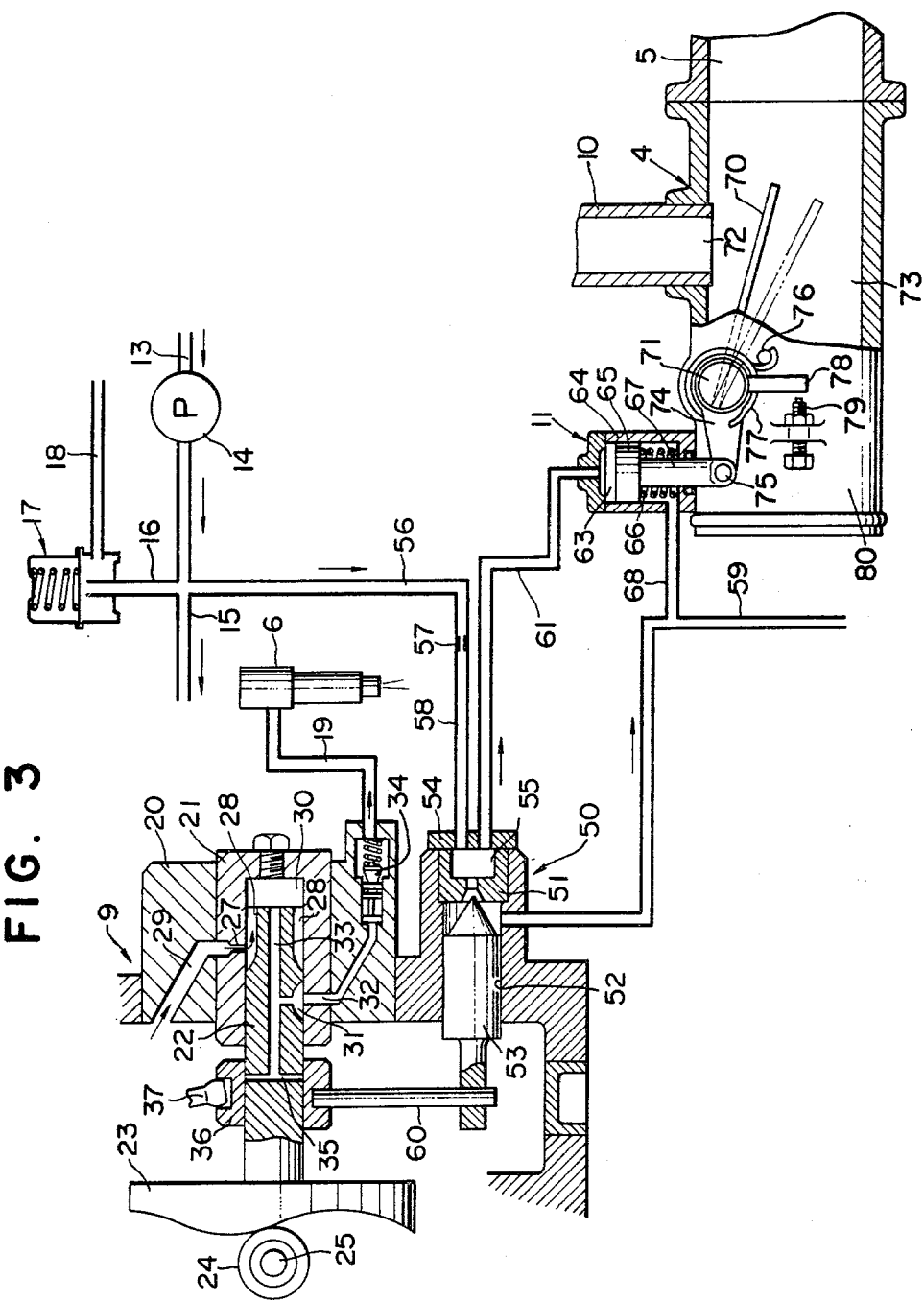
FIG. 3 is a vertical cross section showing the essential parts of the exhaust gas recirculation control system of the present invention.

As is better shown in FIG. 3, the distributing type fuel injection pump 1 is provided with a sealed construction housing 20 within which liquid fuel is constantly supplied by the fuel supply pump 14 through the passage 15 so that the interior of the fuel injection pump is filled up with liquid fuel. Fixed within the fuel injection pump housing 20 is a plunger housing sleeve 21, and within this plunger housing sleeve is received a pump plunger 22, which is movable along its axis, so that it may reciprocate from left to right and back again in the figure, and which is also rotatable about its axis. The pump plunger 22 is formed integrally with a cam plate 23 of generally circular form, which is on the left-hand end, in the figure, of the pump plunger 22. The cam plate 23 and pump plunger 22 are urged leftward in the figure by a spring means which is not shown in the figure. The cam plate 23 bears against a roller 24, which is free to rotate about an axle 25, which is fixed to the pump housing 20 so as not to be movable with respect to this pump housing 20. The cam plate 23 is coupled to and is driven by a drive shaft 26 (which is shown in FIG. 1) which rotates at the same revolution speed as the engine, or at half this revolution speed, depending on whether the diesel internal combustion engine in question is a two-stroke cycle or a four-stroke cycle internal combustion engine. Therefore, at this cam plate 23 turns on the axis of the pump plunger 22, by the action of the spring means, and, by the rolling of the cam plate 23 on the roller 24 and the axle 25, the pump plunger 22 is reciprocated to an fro, in the left and the right directions in the figure, as it rotates.

As the pump plunger 22 moves from the right to the left and back again in the figure, the inlet port 27 in the plunger housing sleeve 21 comes into alignment with one of a plurality of inlet grooves 28 which are cut into the side of the pump plunger 22, and which run generally along the axial direction of its surface. Fuel, therefore, which fills the pump housing 20, is drawn through a connecting hole 29 and the inlet port 27, and comes into the pump chamber 30, which is at the right-hand end in the figure of the pump plunger 22, via the inlet groove 28.

Then, as the pump plunger 22 continues its reciprocating rotation, the inlet port 27 is closed by the edge of the inlet groove 28 traversing it, and next the distribution port 31 of the pump plunger 22 comes into alignment with one of a plurality of distribution passages 32 which are formed in the plunger housing sleeve 21. This distribution port 31 is connected, via a short radial passage, with an axial passage 33 which is bored along the axis of the pump plunger 22, which communicates with the pump chamber 30. It should be noted that there is provided only one inlet port 27, and there are provided a plurality of inlet grooves 28, one for each injector to be supplied with fuel; whereas, on the other hand, there are provided a plurality of distribution passages 32, one for each injector to be supplied with fuel, but there is provided only one distribution port 31. Thus, fuel distribution is performed for each cylinder by directing fuel injection to its injector at the appropriate time, by the rotation of the pump plunger 22.

Next, the pump plunger starts to move to the right in the figure, and thereby pressure is put on the fluid in the pump chamber 30. This fuel can no longer escape through the groove 28 and the inlet port 27, because, as stated above, these are now closed. Therefore, it is driven into the axial passage 33, through the short radial passage, and, via the distribution port 31, into the distribution passage 32, through the delivery valve 34, (which is a one-way valve intended to stop any reverse flow of fuel into the fuel pump, to stop the ingress of air there into, and to make the application of a certain positive pressure necessary for supply of fuel to the injectors), into the injector passage 19, and via this to the fuel injector 6.

The pump plunger continues this rightward movement in the figure, pumping fuel into the delivery passage 32 and to the fuel injector 6, until the spill port 35 moves out of the spill ring 36, which is closely fitted around the outside of the pump plunger 22 where it projects leftward in the figure from the plunger housing sleeve 21. As seen in the figure, this spill port 35 is a transverse passage bored radially through the pump plunger 22 at the end of the axial passage 33 and communicating therewith. When this spill port 35 is uncovered by the spill ring 36, the pump chamber 30 is connected, via the axial passage 33 and the spill port 35, with the inside of the pump housing 20, and the fuel under pressure in the pump chamber 30 and the axial passage 33 is able to escape to the inside of the pump housing 20 via the spill port 35, and is therefore no longer at high pressure, but at the relatively low pressure which is present in the pump housing 20. Thereby, pumping of fuel to the fuel injectors immediately ceases, by the action of the valve 34, as well as by the action of one-way valves in the injectors themselves.

Figure 2:
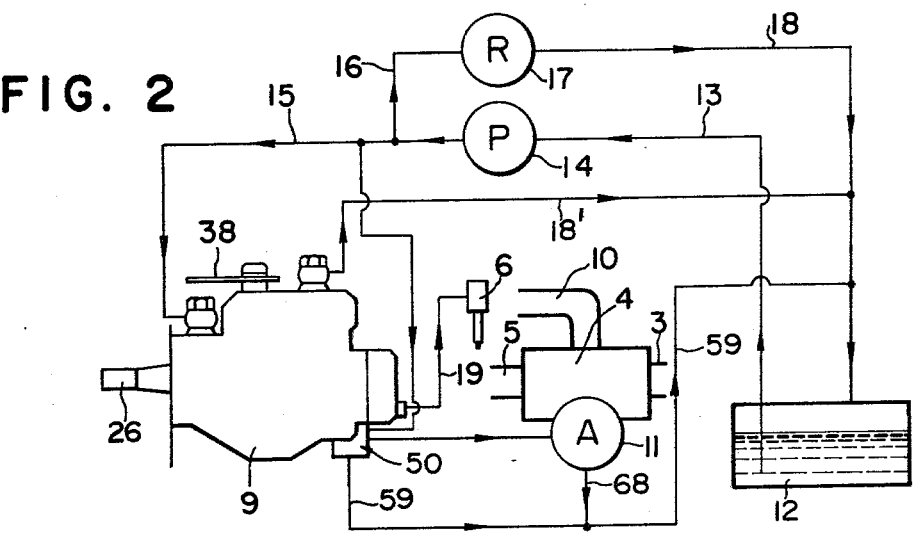
FIG. 2 is a rather schematic diagram showing the fuel supply system and the exhaust gas recirculation system of a diesel engine, combined in accordance with the present invention.

This spill ring 36 is moved to and fro, to the right and the left in the figure, by a lever 37. This lever 37 is coupled to a control lever 38 (FIG. 2), through a governing device of a well-known type which is not shown in the figure, so that, when the control lever 38 is operated in accordance with manipulation of an accelerator pedal operatively connected with the control lever, in response to increased load on the engine, the spill ring 36 is moved in the rightward direction in the figure, and, in response to decreased load on the engine, the spill ring 36 is moved in the leftward direction in the figure. It will be seen that the amount of fuel injected by the above described fuel injection pump 1 is determined by the position of the spill ring 36. In other words, if the spill ring 36 is moved to a certain amount in the leftward direction in the figure, the interval during a single reciprocating stroke of the pump plunger 22 during which the spill port 35 is opened and is uncovered by the spill ring 36 is longer, and therefore the effective stroke of the pump is shorter, and hence the amount of fuel delivered is less. On the other hand, if the spill ring 36 is moved to a certain amount in the righward direction in the figure, the interval during a single reciprocating stroke of the pump plunger 22 during which the spill port 35 is open and is uncovered by the spill ring 36 is shorter, and therefore the effective stroke of the pump is longer, and hence the amount of fuel delivered is greater.

Thus, the spill ring 36 may be termed a movable fuel amount determining element.

The above described construction of a fuel pump is not per se novel. However, in this fuel pump, which contains a movable fuel amount determining element, there is provided a conversion device, according to the present invention, generally designated at 50, which provides a fluid pressure corresponding to the movement of this spill ring or movable fuel amount determining element 36. Thereby a fluid pressure is available which corresponds closely to the amount of fuel injected into the cylinders of the engine moment by moment, and this pressure thus corresponds to the load on the engine.

The conversion device 50 comprises a valve seat element 51 fixed to the pump housing 20, and a needle element 53 which is supported so as to move to and fro along its axis, left and right in the drawing, within a supporting bore 52 which is formed in the pump housing 20. The valve seat element 51 and the needle element 53 cooperate, as seen in the drawing, to form a variable orifice, whose effective opening area is thus determined by the relative positions of the needle element 53 and the valve seat element 51. The needle element 53 is linked by a coupling rod 60 to the spill ring 36, and moves left and right therewith, thus determining the effective opening area of the orifice which is formed in cooperation with the valve seat element 51. In this embodiment, as the needle element 53 moves to the right in the figure, the effective orifice area is diminished.

Together with a cover plate 54, the valve seat element 51 defines a pressure adjustment chamber 55. The two pipes 58 and 61 lead to this pressure adjustment chamber 55. The fuel pipe 58 leads, via a fixed metering orifice element 57, to the supply pipe 56, which joins to the pipe 15 at an intermediate position thereof which contains fuel supplied by the supply fuel pump 14, as has been mentioned above, at a substantially constant pressure, and is supplied with fuel therefrom. The pressure take-off pipe 61 is used for taking off the pressure in the pressure adjustment chamber 55, as explaned hereinunder, and no substantial on-going flow occurs therein.

Thus, fuel supplied at a substantially constant pressure by the pump 14 flows through the supply pipe 56, through the fixed metering orifice element 57, through the pipe 58, into the pressure adjustment chamber 55, past the variable orifice formed between the valve seat element 51 and the point of the needle element 53, and into the inside of the supporting bore 52, from which it is drained, via a drain pipe 59, back to the fuel tank 12 as shown in FIG. 1.

It will be easily seen by those skilled in the hydraulic art that, as the fluid fuel flows along this path from the substantially constant source of fluid pressure as at 14, the fluid pressure within the pressure adjustment chamber 55 will be raised and lowered, depending upon the position of the needle element 52 with respect to the valve seat element 51, and therefore according to the position of the spill ring 36. Therefore, this pressure will represent the load on the engine.

The pressure take-off pipe 61 leading from the pressure adjustment chamber 55 provides the abovementioned fluid pressure, which corresponds to the load on the engine, to the pressure chamber 63, which is formed within the housing 64 of the pressure reaction type actuator 11. Reciprocating within this housing 64 is a piston 65, which is driven downward in the figure by the pressure in the pressure chamber 63, and is biased upward in the figure by the biasing force of the compression coil spring 66 and by any residual fluid pressure that may exist in the tank return passage 59, which is led to the other side of the piston 65 by a passage 68 which also serves to drain any fuel that may leak past the piston 65. The piston 65 is connected with one end of a piston rod 67. It will be seen that the piston 65 and the piston rod 67 are moved downward in the figure by an amount which corresponds to the amount of movement of the spill ring 36, i.e. to the amount of fuel currently being injected into the engine, i.e. the current load on the engine.

The exhaust gas recirculation control valve 4 comprises a flapper valve element 70 supported at its one end by a shaft 71. As the shaft 71 is rotated in the clockwise direction in the figure, the valve element 70 is set more apart from the gas inlet port 72 which opens at the end of the exhaust gas recirculation passage 10, so that the exhaust gas recirculation control valve 4 is more opened, while the valve element 70 simultaneously throttles the air inlet passage 73, whereby an effective increase of exhaust gas recirculation is accomplished. A drive lever 74 is connected at its one end to the shaft 71, the other end of the lever being connected with the other end of the piston rod 67 of the actuator 11 by a pin 75. The shaft 71 is resiliently driven in the clockwise direction, i.e. in the direction of increasing opening of the valve 4 by a twisting coil spring 77 mounted between the lever 74 and a pin 76 mounted to the pipe 80 of the inlet air passage 73. The maximum opening of the flapper valve element 70 is determined by a stop lever 78 mounted to the shaft 71 being put into contact with an adjustable stop screw 79 also mounted to the pipe body 80. This maximum opening of the flapper valve element 70 may be as shown by phantom lines in FIG. 3.

Figure 4:
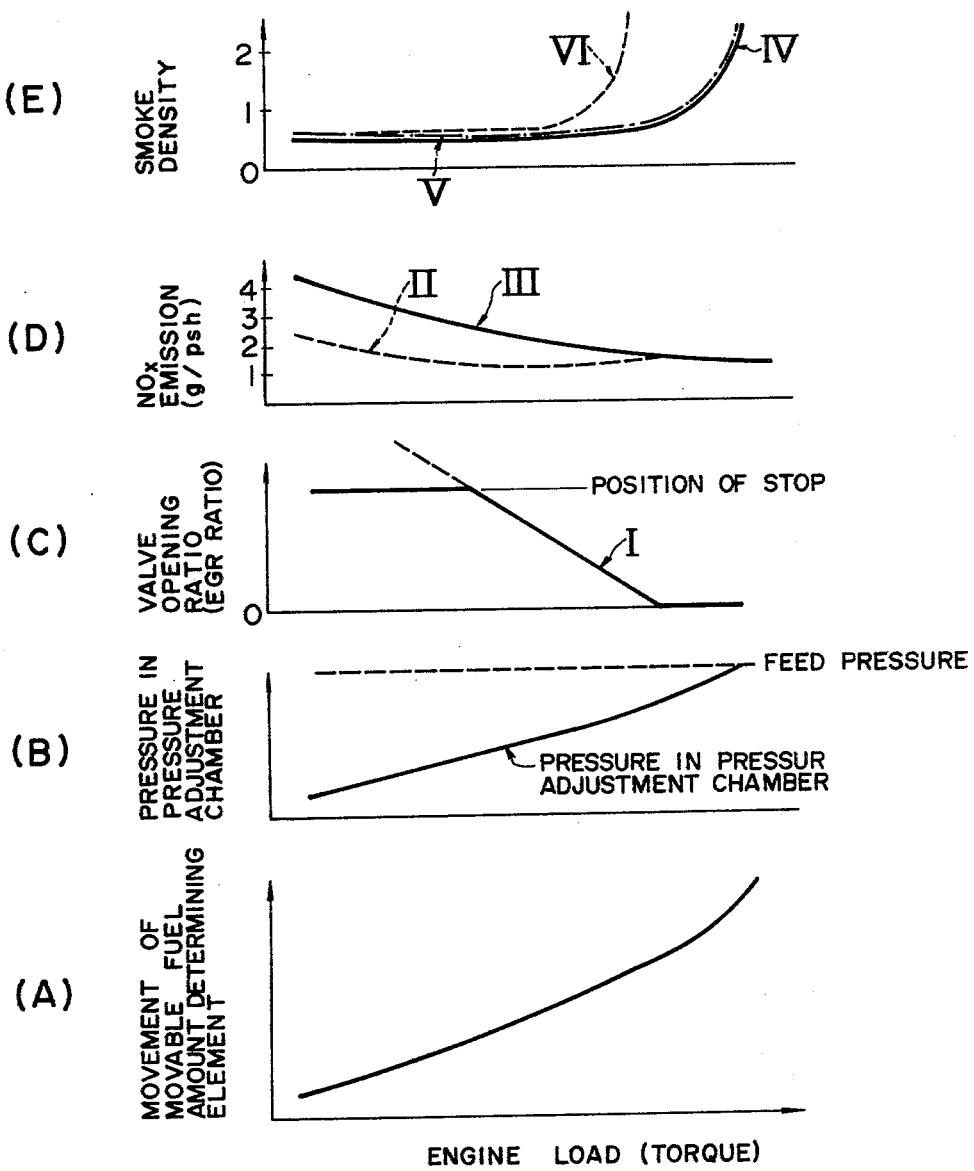
FIG. 4 shows graphs, showing various performances of the engine and the related fuel supply system, relative to engine output torque.

The output torque of or the load on a diesel engine is substantially proportional to the amount of fuel injected, and, therefore, to displacement of a fuel amount determining element such as the spill ring. However, this relation is not exactly proportional, because engine efficiency varies in accordance with load. As a result, the relation between engine load and displacement of the fuel amount determining element becomes as shown in FIG. 4 (A).

As explained above, the pressure in the pressure adjustment chamber 55 is substantially proportional to displacement of the fuel amount determining element like the spill ring 36. Therefore, the pressure in the pressure adjustment chamber 55 is substantially proportional to engine load as shown in FIG. 4 (B). When the pressure in the pressure adjustment chamber 55 varies as shown in FIG. 4 (B), opening of the exhaust gas recirculation control valve 4 constructed by the flapper valve element 70 operated by the actuator 11 varies as shown in FIG. 4 (C). In this figure, as shown by line I, the opening ratio of the exhaust gas recirculation control valve increases as engine load decreases until it reaches the maximum opening ratio which is determined by the stop lever 78 engaging the stop screw 79, and thereafter the opening ratio is maintained at the maximum opening ratio.

Figure 5:
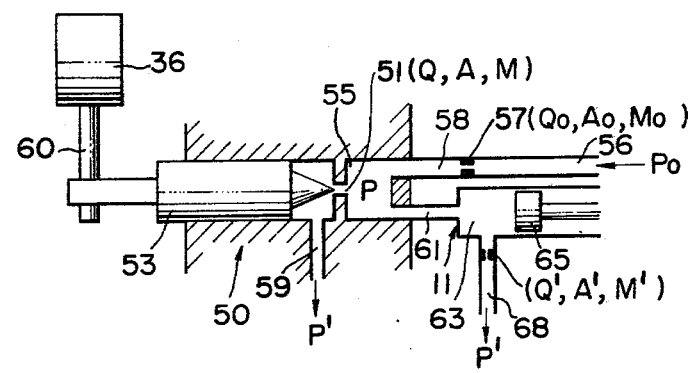
FIG. 5 is a diagrammatical view of the conversion device for the purpose of analyzing the performance of this device.

More theoretically analyzed, the relation shown in FIG. 4 (B) is obtained, referring to FIG. 5, as follows: FIG. 5 shows a diagram which is equivalent to the conversion device 50 shown in FIG. 3. Therefore, the portions in FIG. 5 corresponding to those shown in FIG. 3 are designated by the same reference numerals as in FIG. 3.

Expressing the pressure supplied through the passage 56 by Po, the pressure in the pressure adjustment chamber 55 by P, flow amount of fuel flowing through the fixed orifice 57 by Qo, flow area of the fixed orifice 57 by Ao, flow coefficient of the fixed orifice 57 by Mo, flow amount of fuel flowing through the variable orifice constructed by the valve seat 51 and the needle element 53 by Q, effective flow area of the variable orifice by A, flow coefficient of the variable orifice by M, flow amount of fuel which leaks through the clearance formed between the piston 65 and the casing 64 of the actuator 11 by Q', flow area of the clearance by A', flow coefficient of the clearance by M', acceleration of gravity by g, and specific gravity of fuel by r, the flow amount Qo of the fuel which flows through the fixed orifice 57 and the passage 58 into the pressure adjustment chamber 55 is expressed by the following formula:

$$Qo = MoAo \sqrt{2g/r(Po - P)} \qquad (1)$$

The flow amount Q of the fuel which flows out of the pressure adjustment chamber 55 through the variable orifice and the passage 59 is given by:

$$Q = MA \sqrt{2g/r(P - P')} \qquad (2)$$

The flow amount Q' of the fuel which leaks through the actuator 11 is given by:

$$Q' = M'A' \sqrt{2g/r(P - P')} \qquad (3)$$

Since Qo=Q+Q', by applying formulas (1), (2) and (3) to this equation, the following formula is obtained.

$$MoAo \sqrt{2g/r(Po - P)} = (MA + M'A') \sqrt{2g/r(P - P')} \qquad (4)$$

This is rearranged to:

$$Mo^2Ao^2(Po-P)=(MA+M'A')^2(P-P') \qquad (5)$$

From this, P is obtained as follows:

$$P=(Mo^2Ao^2Po+(MA+M'A')^2P')/((MA+M'A')^2+Mo^2Ao^2) \qquad (6)$$

Herein, Po is substantially constant, while P' is substantially atmospheric pressure. Therefore, if the shapes of the valve seat 51 and the needle element 53 are properly designed so as to provide a proper performance of MA, the relation between the pressure in the pressure adjustment chamber 55 and engine load as shown in FIG. 4 (B) is obtained.

Returning again to FIG. 4, FIG. 4 (D) shows the performance of NOx emission per 1 horse power output. In this figure, line II shows the performance where exhaust gas recirculation is done, whereas line III shows that in the case where exhaust gas recirculation is not done.

Further, FIG. 4 (E) shows the performance of smoke density. In this figure, line IV shows the performance in the case where exhaust gas recirculation is not done. Line V shows that in the case where exhaust gas recirculation is done under the control effected by the device of the present invention. Line VI shows that in the case where exhaust gas recirculation is done under no control. From this figure, it will be appreciated that, when exhaust gas recirculation is done under the control of the device of the present invention, in high engine load region, smoke density is supressed at substantially the same level as in the case where no exhaust gas recirculation is done.

Although in the above the present invention has been explained with respect to the case where it has been applied to the distributing type fuel injection pump, the present invention is also applicable to the in-line type fuel injection pump. In this case, the needle element in the conversion device may be connected to the control rack of the in-line type fuel injection pump.

Although the present invention has been shown and described in terms of a preferred embodiment thereof, it should be clearly understood that various changes and omissions in the form and content of the particular embodiment may be made therein, without departing from its scope or spirit. Therefore, it is expressly desired that the scope of the present invention, and of the monopoly sought to be granted by Letters Patent should be determined, not by any details of the embodiment described or of the purely illustrative drawings but solely by the appended claims.

I claim:

1. In a diesel engine, comprising an exhaust system, an inlet system, and an exhaust gas recirculation system, a device which is the combination of:
    a fuel injection pump which comprises a movable fuel amount determining element, the position of which regulates the amount of fuel provided for injection by the fuel injection pump;
    a conversion device, comprising:
    a fixed orifice, to the upstream side of which is supplied a substantially constant fluid pressure;
    a fluid passage downstream of the fixed orifice;
    a pressure takeoff passage branching from the fluid passage; and
    a variable orifice downstream of the fluid passage whose effective opening area is varied according to the movement of the fuel amount determining element;
    fluid flowing from the upstream side of the fixed orifice through it, through the fluid passage, and through the variable orifice, in that order, the pressure of fluid at the point where the pressure takeoff passage branches from the fluid passage varying according to the position of the fuel amount determining element;
    an exhaust gas recirculation control valve, which controls the amount of exhaust gas recirculated from
    the exhaust system to the inlet system through the exhaust gas recirculation system; and,
    an actuator, which is energized by the fluid pressure supplied through the pressure takeoff passage, and operates the exhaust gas recirculation control valve.

2. A combination device as in claim 1, wherein the variable orifice comprises a valve seat and a needle element with a pointed end which co-operates with the valve seat so as to provide a passage of variable effective area, according to the axial movement of the needle element.

3. A combination device as in claim 1, wherein the fuel injection pump is a distributor type fuel pump, and the movable fuel amount determining element is a spill ring, and further comprising a connecting rod which links the needle element to the spill ring.

4. A combination device as in any one of claims 1-3, wherein the mode of variation of the effective area of the opening of the variable orifice is such that the fluid pressure in the pressure takeoff passage increases as the load on the engine increases as effected by displacement of the fuel amount determining element.

5. A combination device as in claim 4, wherein the exhaust gas recirculation control valve is so operated by the acuator that, when the fluid pressure supplied to the actuator increases, the exhaust gas recirculation control valve reduces exhaust gas recirculation ratio.

6. A combination device as in any one of claims 1-3, wherein the exhaust gas recirculation control valve is a flapper type valve.

* * * * *

UNITED STATES PATENT AND TRADEMARK OFFICE
CERTIFICATE OF CORRECTION

PATENT NO. : 4,286,567
DATED : September 1, 1981
INVENTOR(S) : Ueda

It is certified that error appears in the above—identified patent and that said Letters Patent is hereby corrected as shown below:

After "[22] Filed: Dec. 27, 1979" insert the following:

--[30] Foreign Application Priority Data

Aug. 13, 1979 [JP] Japan ...... 54-103394 --

Signed and Sealed this

Twenty-sixth Day of January 1982

[SEAL]

Attest:

GERALD J. MOSSINGHOFF

Attesting Officer

Commissioner of Patents and Trademarks